US009303095B2

(12) United States Patent
Siraux et al.

(10) Patent No.: US 9,303,095 B2
(45) Date of Patent: *Apr. 5, 2016

(54) PROCESS FOR PREPARING POLYOLEFINS

(71) Applicant: TOTAL RESEARCH & TECHNOLOGY FELUY, Seneffe (Feluy) (BE)

(72) Inventors: Daniel Siraux, Naast (BE); Daan Dewachter, Mechelen (BE); Louis Fouarge, Dilbeek (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,992

(22) Filed: Nov. 6, 2014

(65) Prior Publication Data
US 2015/0065666 A1    Mar. 5, 2015

Related U.S. Application Data

(63) Continuation of application No. 13/812,791, filed as application No. PCT/EP2011/063150 on Jul. 29, 2011, now Pat. No. 8,916,657.

(30) Foreign Application Priority Data

Jul. 30, 2010  (EP) ..................................... 10171362

(51) Int. Cl.
| | |
|---|---|
| C08F 2/00 | (2006.01) |
| C08F 2/38 | (2006.01) |
| C08F 210/00 | (2006.01) |
| C08F 2/01 | (2006.01) |
| B01J 8/10 | (2006.01) |
| B01J 19/18 | (2006.01) |
| C08F 210/16 | (2006.01) |

(52) U.S. Cl.
CPC ... *C08F 2/01* (2013.01); *B01J 8/10* (2013.01); *B01J 19/1837* (2013.01); *C08F 2/005* (2013.01); *C08F 210/16* (2013.01); *B01J 2208/00212* (2013.01); *B01J 2208/00707* (2013.01); *B01J 2219/0004* (2013.01); *B01J 2219/00094* (2013.01); *B01J 2219/00247* (2013.01); *C08F 2410/02* (2013.01)

(58) Field of Classification Search
CPC ..................... B01J 8/10; B01J 19/1837; B01J 2208/00212; B01J 2208/00707; B01J 2219/0004; B01J 2219/00247; C08F 210/16; C08F 2/14; C08F 2/005; C08F 4/69; C08F 2/01; C08F 2500/24; C08F 2500/05; C08F 2410/02
USPC .............................................. 526/64, 82, 348
See application file for complete search history.

(56) References Cited

U.S. PATENT DOCUMENTS

| | | | |
|---|---|---|---|
| 8,916,657 B2* | 12/2014 | Siraux ........................ | B01J 8/10 526/348 |
| 2005/0272891 A1* | 12/2005 | Fouarge ................. | B01J 8/0035 526/64 |

* cited by examiner

*Primary Examiner* — William Cheung
(74) *Attorney, Agent, or Firm* — Albert Shung

(57) ABSTRACT

The present invention relates to a process of preparing a polyolefin in a loop reactor by introducing anti-fouling agent in by-pass pipes. Also, the invention relates to the use of anti-fouling agent to prevent blockage by feeding the anti-fouling agent into the by-pass pipes of the loop reactor.

17 Claims, 1 Drawing Sheet

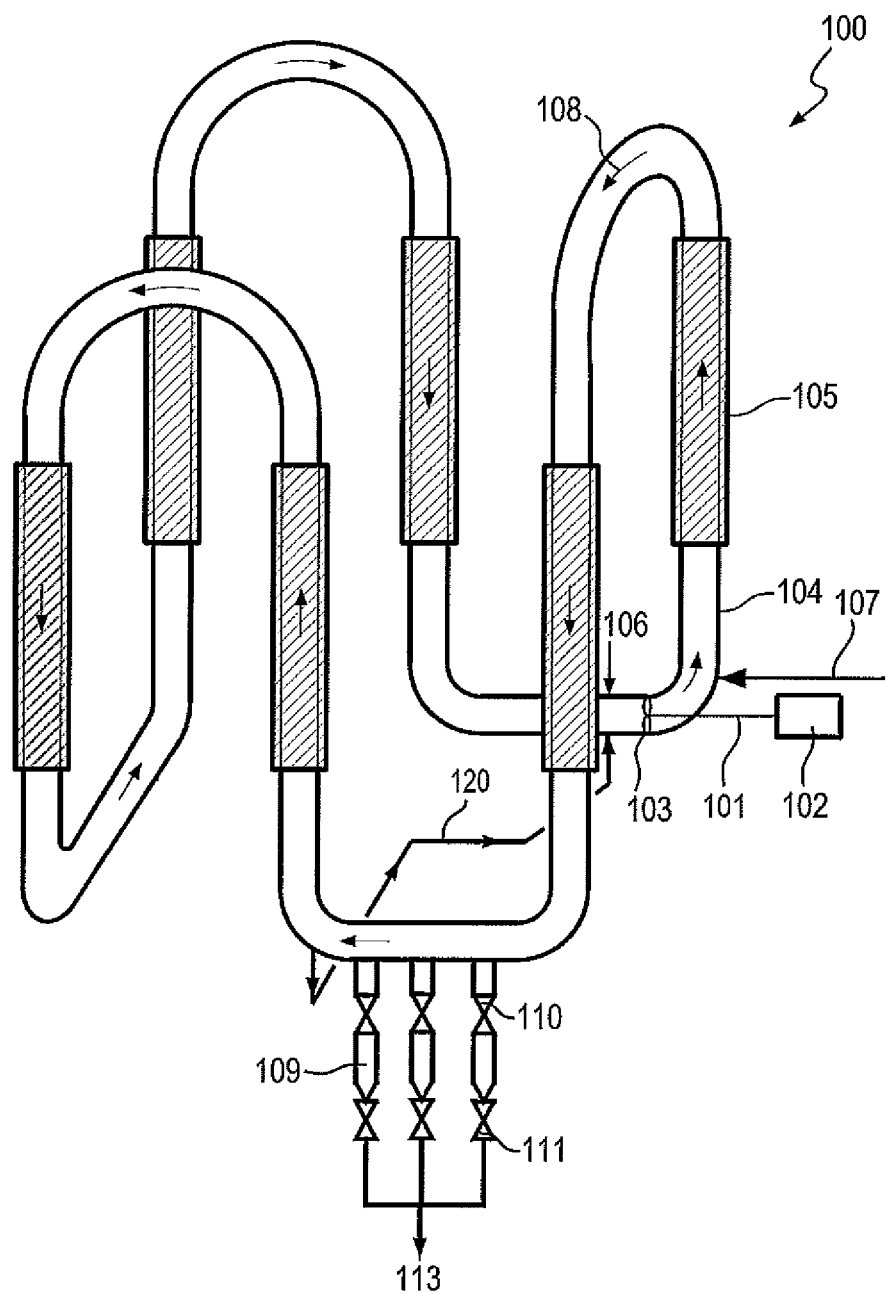

PROCESS FOR PREPARING POLYOLEFINS

CROSS-REFERENCE TO RELATED APPLICATIONS

This application is a Continuation of U.S. application Ser. No. 13/812,791, filed Jan. 28, 2013, now U.S. Pat. No. 8,915,657, which claims the benefit of PCT/EP2011/063150, filed Jul. 29, 2011, which claims priority from EP 10171362.6, filed Jul. 30, 2010.

TECHNICAL FIELD OF THE INVENTION

The present invention relates to processes for the preparation of polyolefins and the use of anti-fouling agents therein.

BACKGROUND OF THE INVENTION

Polyolefins, such as polyethylene (PE), are synthesized by polymerizing monomers, such as ethylene ($CH_2=CH_2$). Because it is cheap, safe, stable to most environments and easy to be processed polyolefins are useful in many applications. Polyethylene can be classified into several types, such as but not limited to LDPE (Low Density Polyethylene), LLDPE (Linear Low Density Polyethylene), and HDPE (High Density Polyethylene) as well as High Molecular Weight (HMW), Medium Molecular Weight (MMW) and Low Molecular Weight (LMW). Each type of polyethylene has different properties and characteristics.

Olefin (such as ethylene) polymerizations are frequently carried out in a loop reactor using monomer (such as ethylene), diluent and catalyst, optionally an activating agent, optionally one or more co-monomer(s), and optionally hydrogen.

Polymerization in a loop reactor is usually performed under slurry conditions, with the produced polymer usually in a form of solid particles suspended in diluent. The slurry is circulated continuously in the reactor with a pump to maintain efficient suspension of the polymer solid particles in the liquid diluent. Polymer slurry is discharged from the loop reactor by means of settling legs, which operate on a batch principle to recover the slurry. Settling in the legs is used to increase the solid concentration of the slurry finally recovered as product slurry. The product slurry is further discharged through heated flash lines to a flash tank, where most of the diluent and unreacted monomers are flashed off and recycled.

Optionally, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be mixed and pelletized.

During the mixing step, polymer product and optional additives are mixed intimately in order to obtain a compound as homogeneous as possible. Preferably, mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

It has been found on an industrial scale that while the polymer particles are insoluble or substantially insoluble in the diluent, the polymer product has some tendency to deposit on the walls of the polymerization reactor. This so-called "fouling" can lead to a decrease in the efficiency of heat exchange between the reactor bulk and the coolant around the reactor. This leads in some cases to loss of reactor control due to overheating, or to reactor or down stream polymer processing equipment failure due to formation of agglomerates (ropes, chunks).

This "fouling" is caused in part by fines and also by the build up of electrostatic charge on the walls on the reactor. Attempts to avoid fouling during slurry polymerization have been made by adding an antifouling agent in the polymerization medium. Typically, the antifouling agent acts for example to make the medium more conductive, thus preventing to some extent the formation of electrostatic charge, which is one cause of the build-up of polymer on the wall of the reactor.

However, complications may still occur during polyolefin production such as partial or even complete blockage of the loop reactor. These problems can be even more pronounced with particular polyolefins, such as polyethylenes. Blockage may require stopping the production process to unclog and clean the reactor; only then, production can be resumed.

There remains a need in the art for an improved polyolefin production process, particularly for polyethylene and more particularly for high molecular weight polyethylene of high density, and especially to reduce production costs, control process conditions and/or produce optimal polymer end-products.

SUMMARY OF THE INVENTION

Surprisingly, the present inventors have found a way to improve polyolefin preparation processes and overcome at least one of the above and other problems of the prior art. Accordingly, the present invention relates to a process of preparing a polyolefin in a loop reactor, said loop reactor comprising interconnected pipes defining a reactor path, and wherein said loop reactor further comprises one or more by-pass pipes, wherein said polyolefin is prepared in the presence of anti-fouling agent, characterized in that at least part of the anti-fouling agent is introduced into the reactor by feeding into one or more of said by-pass pipes.

Preferably, the present invention relates to a process of preparing a polyolefin in a loop reactor, said loop reactor comprising interconnected pipes defining a reactor path, and wherein said loop reactor further comprises one or more by-pass pipes connecting two points of the same loop, wherein said polyolefin is prepared in the presence of anti-fouling agent, characterized in that a composition comprising the anti-fouling agent and a diluent is introduced into the reactor by feeding into one or more of said by-pass pipes, via a diluent feed line directly connected to said one or more by-pass pipes, and wherein said composition comprises less than 10% by weight of monomer, more preferably less than 5% by weight, most preferably less than 1% by weight of monomer.

Preferably, the present invention relates to a process of preparing a polyolefin in a loop reactor, said loop reactor comprising interconnected pipes defining a reactor main path, and wherein said loop reactor further comprises on said interconnected pipes one or more by-pass pipes connecting two points of the same loop by an alternate path having a different transit time than that of the main path, wherein said polyolefin is prepared in the presence of anti-fouling agent, characterized in that a composition comprising the anti-fouling agent and a diluent is introduced into the reactor by feeding into one or more of said by-pass pipes, via a diluent feed line directly connected to said one or more by-pass pipes, and wherein said composition comprises less than 10% by weight of monomer, more preferably less than 5% by weight, most preferably less than 1% by weight of monomer.

In another embodiment, the present invention relates to the use of an antifouling agent to prevent or reduce fouling of a loop reactor comprising one or more by-pass pipes, by introducing the antifouling agent into one or more of said by-pass pipes. Preferably, the invention relates to the use of a composition comprising an antifouling agent and a diluent to prevent or reduce fouling of a loop reactor, comprising one or more by-pass pipes connecting two points of the same loop, by introducing the composition into one or more of said by-pass pipes, via a diluent feed line directly connected to said one or more by-pass pipes, and wherein said composition comprises less than 10% by weight of monomer, more preferably less than 5% by weight, most preferably less than 1% by weight of monomer.

Surprisingly, the present inventors have found that the invention leads to fewer blockage, lower production costs, better controlled process conditions and/or more optimal polymer end-products. In particular, the inventors have found that introduction of the anti-fouling agent according to the invention (in the manner, i.e. the way and/or the location) leads to fewer reactor blockages and other benefits.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention.

BRIEF DESCRIPTION OF THE FIGURES

FIG. 1 schematically illustrates a loop reactor provided with a by-pass that can be used in a process of preparing a polyolefin in a loop reactor, according to an embodiment of the present invention.

DETAILED DESCRIPTION OF INVENTION

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The process is particularly useful in an alpha-olefin polymerization reactor wherein the polymerization is performed under high pressure, and more especially into slurry reactor. The case of ethylene is exemplified, but in a non limitative manner.

In particular, the present invention relates to a process of preparing a polyolefin in a loop reactor, said loop reactor comprising interconnected pipes defining a reactor path (loop), and wherein said loop reactor further comprises on said interconnected pipes one or more by-pass pipes connecting two points of the same loop by an alternate route having a different transit time than that of the main route, wherein said polyolefin is prepared in the presence of anti-fouling agent, characterized in that at least part of the anti-fouling agent is introduced into the reactor by feeding into one or more of said by-pass pipes.

Preferably the invention relates to a process of preparing a polyolefin in a loop reactor, said loop reactor comprising interconnected pipes defining a reactor main path, and wherein said loop reactor further comprises on said interconnected pipes one or more by-pass pipes connecting two points of the same loop by an alternate path having a different transit time than that of the main path, characterized in that a composition comprising the anti-fouling agent and a diluent is introduced into the reactor by feeding into one or more of said by-pass pipes, via a diluent feed line directly connected to said one or more by-pass pipes, and wherein said composition comprises less than 10% by weight of monomer, more preferably less than 5% by weight, most preferably less than 1% by weight of monomer.

According to the polymerization process of the present invention, a slurry is preferably prepared by feeding reactants to a loop reactor having one or more loops and comprising on at least one of the one or more loops, one or more by-pass pipes (lines) connecting two points of the same loop by an alternate route having a different transit time than that of the main route; and polymerizing monomer to produce polyolefin (preferably polyethylene) slurry comprising diluent and solid polyolefin (preferably polyethylene) particles. Said reactants preferably include diluent, monomers, one or more anti-fouling agent, catalyst, optionally hydrogen, optionally one or more co-monomers, and optionally activating agent. According to the present invention, at least part of the anti-fouling agent is fed into one or more of said by-pass pipes.

As used in the present invention, the term "anti-fouling agent" refers to material that prevents fouling of the inside of the reactor wall. Preferably, the anti-fouling agent is fed by way of a line connected to the beginning of said by-pass pipe. Preferably, the anti-fouling agent is fed to the by-pass under diluent flushing, wherein the diluent is preferably flushed at a rate of more than 100 kg/h.

According to the invention, anti-fouling agent is fed to the loop reactor through a line connected to said by-pass pipe, preferably the beginning of the by-pass pipe. According to the invention, it will be understood that antifouling agent is first introduced into the reactor through the line into the by-pass.

Preferably, at least part of the antifouling agent is fed to the by-pass, more preferably at least 10%, most preferably at least 25%, and in particular preferred at least 50% by weight of the total and especially preferred is to introduce all (100%) antifouling agent in the by-pass.

Preferably, the anti-fouling agent is fed under flushing with diluent, more preferably under flushing with diluent at a rate of more than 100 kg/h, most preferably at a rate of more than 300 kg/h, more preferably around 750 kg/h.

In an embodiment, the anti-fouling agent comprises cationic agents, anionic agents, nonionic agents, organometallic agents, polymeric agents or mixtures thereof.

Suitable examples of cationic agents can be selected from quaternary ammonium, sulfonium or phosphonium salts with long (preferably $C_{5-20}$) hydrocarbon chain, for examples chloride, sulfate, nitrate, or hydrogen phosphate salts thereof.

Examples of suitable anionic agents can be selected from sulfated oils, sulfated amide oils, sulfated ester oils, fatty alcohol sulfuric ester salts, alkyl sulfuric ester salts, fatty acid ethyl sulfonic acid salts, alkyl sulfonic acid salts (for example sodium alkyl sulfonates), alkylnaphthalene-sulfonic acid salts, alkylbenzene-sulfonic acid salts, phosphoric esters (for example alkyl phosphonates), alkyl phosphates, alkyl dithiocarbamate or mixtures thereof.

Examples of suitable nonionic agents can be selected from partial fatty acid esters of polyhydric alcohols; alkoxylated fatty alcohols such as ethoxylated or propoxylated fatty alcohols; polyethylene glycol (PEG) esters of fatty acids and alkylphenols; glyceryl esters of fatty acids and sorbitol esters; ethylene oxide adducts of fatty amines or fatty acid amides; ethylene oxide adducts of alkylphenols; ethylene oxide adducts of alkylnaphthols; polyethylene glycol, and fatty acid esters of alkyldiethanolamines, or mixtures thereof.

Examples of suitable organometallic agents can be selected from neoalkyl titanates and zirconates, or mixtures thereof.

Examples of suitable polymeric agents can be selected from polyoxyalkylenic compounds such as polyethylene glycol hexadecyl ether; ethylene oxide/propylene oxide copolymers; or mixtures thereof. For example, suitable ethylene oxide/propylene oxide copolymer antifouling agent can comprise one or more —$(CH_2$—$CH_2$—$O)_k$— where each k is in the range from 1 to 50; and one or more —$(CH_2$—$CH(R)$—$O)_n$— wherein R comprises an alkyl group having from 1 to 6 carbon atoms and each n is in the range from 1 to 50, and terminated by a R' and a R" end groups, wherein R' is OH or an alkoxy having from 1 to 6 carbon atoms and R" is H or an alkyl having from 1 to 6 carbon atoms. In an embodiment, the anti-fouling agent is a block polymer, more preferably a triblock polymer. In an embodiment, the antifouling agent is a block polymer of general formula:

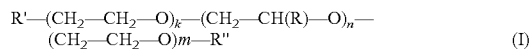 (I)

or

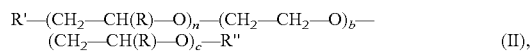 (II), wherein R comprises an alkyl group; R' and R" are end groups; k is from 1 to 50; n is from 1 to 50; m is greater than or equal to 1; a is from 1 to 50; b is from 1 to 50; and c is from 0 to 50; k and m and a and c may be the same or different. Preferably R is a C1 to C3 alkyl group. More preferably, R is a methyl group. Preferably, in one embodiment, k is greater than 1 and m is greater than 1. Also preferably, in another embodiment a is 0 or c is 0. Preferred R' and R" groups include H; OH; alkyl, and alkoxy groups. Preferred alkyl groups are C1 to C3 alkyl groups. Preferred alkoxy groups are C1 to C3 alkoxy groups. In formulae (I) and (II) above, it is preferred that R' is OH or an alkoxy group, preferably OH or a C1 to C3 alkoxy group. Further, it is preferred that R" is H or an alkyl group, preferably H or a C1 to C3 alkyl group. A particularly preferred polymer has general formula (III): R'—$(CH_2$—$CH_2$—$O)_k$—$(CH_2$—$CH(CH_3)$—$O)_n$—$(CH_2$—$CH_2$—$O)_m$—R" (III), wherein R', R", k, n, and m independently are as defined anywhere above. A further preferred polymer has general formula (IV): OH—$(CH_2$—$CH_2$—$O)_k$—$(CH_2$—$CH(R)$—$O)_n$—$(CH_2$—$CH_2$—$O)_m$—H (IV), wherein R, k, n, and m independently are as defined anywhere above. It will be appreciated that, by virtue of the preferred molecular weights for the anti-fouling agent and the preferred ethylene oxide contents in the present anti-fouling agent given above, preferred values for a, b, c, k, n, and m can be derived. Preferably, the weight percentage of ethylene oxide in the anti-fouling agent is in the range of from 5 to 40%, more preferably from 8 to 30%, even more preferably from 10 to 20%, most preferably about 10%. In an embodiment, the ethylene oxide/propylene oxide copolymer has a molecular weight (MW) greater than 1000 Daltons, preferably greater than 2000 Daltons, more preferably in the range from 2000-4500 Daltons.

Examples of suitable commercially available antifouling agents include those under the trade designation Armostat® (such as Armostate 300 (N,N-bis-(2-hydroxyethyl)-($C_{10}$-$C_{20}$)alkylamine), Armostate 410 (bis(2-hydroxyethyl)cocoamine), and Armostat® 600 (N,N-bis(2-hydroxy-ethyl)alkylamine) from Akzo Nobel Corporation; those under the trade designation Chemax X997® (>50% of dicocoalkyl-dimethyl ammonium chloride, about 35%

1-hexene, <2% isopropanol, and <1% hexane); those under the trade designation Atmere 163 (N,N-Bis(2hydroxy-ethyl) alkylamine) from ICI Americas; those under the trade designation Statsafe 6000 (dodecylbenzenesulfonic acid) from Innospec Limited; those under the trade designation Octastat® 3000 (about 40-50% toluene, about 0-5% propan-2-ol, about 5-15% DINNSA (dinonyinaphthasulphonic acid), about 15-30% solvent naptha, about 1-10% trade secret polymer containing N, and about 10-20% trade secret polymer containing S) from Octel Performance Chemicals; those under the trade designation Kerostate 8190 (about 10-20% alkenes (polymer with sulfur dioxide), about 3-8% benzenesulfonic acid (4-C10-13-sec-alkyl derivatives) and organic solvent from BASF, those under the trade designation Stadis® 450 (about 14 wt % of polybutene sulfate, about 3 wt % of aminoethanolepichlorohydrin polymer, about 13 wt % of alkylbenzenesulfonic acid, about 70 wt % of toluene and trace amounts of quaternary ammonium salt of aliphatic alkyl and propyl alcohol) from E. I. Du Pont de Nemours & Co.; Synperonic PEL121 (ethyleneoxide-propyleneoxide-ethyleneoxide block copolymer, about 10% of propyleneoxide, MW about 4400 Da) from Uniqema and the like. Preferred examples of antifouling agents are dodecylbenzenesulfonic acid or ethyleneoxide-propyleneoxide block copolymer.

Preferred examples of anti-fouling agents for use in the invention are Stadis 450, Statsafe 6000 and Synperonic PEL121. Stadis 450 and Statsafe 6000 are preferably used for Ziegler-Natta catalysts. Synperonic PEL121 is particularly preferred for use with metallocene catalysts.

Preferably, anti-fouling agent is fed to the reactor as a composition with a solvent, preferably dissolved in a solvent. Preferably, the solvent is selected from C4-C10 aliphatic and olefin compounds. Preferably, the solvent is selected from unsaturated (olefin) C4-C10 compounds. In an embodiment, said solvent is selected from hexane, hexene, cyclohexane, or heptane. Most preferably, the solvent is hexene.

Preferably, the anti-fouling composition comprises at least 0.1%, more preferably at least 0.5%, most preferably at least 1% and preferably at most 50%, more preferably at most 30% and most preferably at most 10% by weight of anti-fouling agent.

Preferably, anti-fouling agent is used in the loop reactor at a level of from 0.1 to 50 ppm as a function of the diluent in the polymer slurry, preferably from 1 to 20 ppm, preferably from 1 to 10 ppm, yet more preferably from 1 to 5 ppm, yet more preferably from 1 to 3 ppm.

Preferably, the ratio between the ppm level of antifouling agent in the by-pass pipe and the ppm level of the antifouling agent in reactor path is more than 1, preferably more than 3, preferably more than 5, preferably at most 30, preferably at most 20, for instance around 10. Preferably, the level is expressed as ppm antifouling agent as a function of diluent.

In an embodiment, the present invention relates to a process of preparing a polyolefin in a loop reactor, said loop reactor comprising interconnected pipes defining a reactor path, and wherein said loop reactor further comprises one or more by-pass pipes, wherein said polyolefin is prepared by in the presence of anti-fouling agent, wherein at least part of the anti-fouling agent is introduced into the reactor by feeding into one or more of said by-pass pipes.

As used herein, the term "monomer" refers to olefin compound that is to be polymerized. Examples of olefin monomers are ethylene and propylene. Preferably, the invention is directed to ethylene. The present invention is particularly suitable for polymerization process for preparing polyethylene, and preferably for preparing monomodal or bimodal polyethylene.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

As used herein, the term "diluent" refers to diluents in liquid form that is in a liquid state, liquid at room temperature and preferably liquid under the pressure conditions in the loop reactor. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Suitable ethylene polymerization includes but is not limited to homopolymerization of ethylene, copolymerization of ethylene and a higher 1-olefin co-monomer.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of in the same polymer chain. The term "homo-polymer" refers to a polymer which is made by linking ethylene monomers, in the absence of co-monomers. In an embodiment of the present invention, said co-monomer is 1-hexene.

In a preferred embodiment, reactants comprising the monomer ethylene, isobutane as hydrocarbon diluent, a catalyst, at least one antifouling agent, the co-monomer 1-hexene are used.

As used herein, the term "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts or polymerization catalysts. In the present invention it is especially applicable to ethylene polymerization catalysts such as metallocene catalysts and/or Ziegler-Natta catalysts.

In an embodiment of the present invention, said catalyst is a metallocene catalyst. The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclo-pentadienyl, indenyl, fluorenyl or their derivatives. Use of metallocene catalysts in the polymerization of polyethylene has various advantages. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In an embodiment, the metallocene catalyst has a general formula (I) or (II):

$$(Ar)_2MQ_2 \quad (I);$$

or $$R^1(Ar)_2MQ_2 \quad (II)$$

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR^2_3$ group wherein $R^2$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal M selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein $R^1$ is a divalent group or moiety bridging the two Ar groups and selected from the group consisting of a $C_1$-$C_{20}$ alkylene, a germanium, a silicon, a siloxane, an alkylphosphine and an amine, and wherein said $R^1$ is optionally substituted with one or more substituents each independently selected from the group consisting of halogen, a hydrosilyl, a $SiR^3_3$ group wherein $R^3$ is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis (indenyl) zirconium dichloride, and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene[1-(4-tert-butyl-2-methyl-cyclopentadienyl)](fluoren-9-yl) zirconium dichloride.

The metallocene catalysts are preferably provided on a solid support. The support can be an inert solid, organic or inorganic, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form. The support is preferably a silica compound. In a preferred embodiment, the metallocene catalyst is provided on a solid support, preferably a silica support. In an embodiment, the catalyst for use in the present process is a supported metallocene-alumoxane catalyst consisting of a metallocene and an alumoxane which are bound on a porous silica support.

In another embodiment of the present invention, said catalyst is a Ziegler-Natta catalyst. The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. No. 6,930,071 and U.S. Pat. No. 6,864,207, which are incorporated herein by reference.

In an embodiment, the catalyst is added to the reactor as a catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit.

Optionally, activating agent is used in processes according to the invention. The term "activating agent" refers to materials that can be used in conjunction with a catalyst in order to improve the activity of the catalyst during the polymerization reaction. In the present invention, it particularly refers to an organo-aluminium compound, being optionally halogenated, having general formula $AlR^{11}R^{12}R^{13}$ or $AlR^{11}R^{12}Y$, wherein $R^{11}$, $R^{12}$, $R^{13}$ is an alkyl having from 1 to 6 carbon atoms and $R^{11}$, $R^{12}$, $R^{13}$ may be the same or different and wherein Y is hydrogen or a halogen, as disclosed in U.S. Pat. No. 6,930, 071 and U.S. Pat. No. 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10 to 50% by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

The polymerization can be performed over a wide temperature range. Preferably, the temperature is within the range of about 0° C. to about 110° C. A more preferred range is from about 60° C. to about 100° C., more preferably from about 80° C. to 110° C.

The reactor pressure is preferably held between 20 and 100 bar, 30 to 50 bar, more preferably at a pressure of 37 to 45 bar.

The loop reactor of the present invention comprises interconnected pipes, defining a reactor path or loop, and further one or more by-pass pipes provided on said loop, connecting two points of the loop by an alternate route having a different transit time than that of the main route. The loop reactor of the present invention may be a single loop reactor or a double loop reactor. A double loop reactor consists of two interconnected single loop reactors. However, preferably, the by-pass pipe of the present invention feeds back into the same loop reactor.

Preferably, the entry point into the by-pass line is located upstream of the exit point in order to benefit from the pressure difference between these two points and thereby to produce a natural acceleration. In addition, the bends in the by-pass line are preferably long-radius bends, preferably having a radius of curvature that is equal to at least 10 times the diameter of the by-pass line. Preferably, the slurry is re-injected to the main route at an angle of from 1 to 90 degrees, preferably at an angle of from 30 to 60 degrees, for instance around 45 degrees.

Preferably, the interconnected pipes of the loop reactor of the present invention are jacketed with cooling medium. The by-pass line may be jacketed with cooling medium. Preferably, the by-pass of the invention increases the homogeneity of the polymer mix, preferably by longitudinal mixing of the polymer mix. Surprisingly, we have now found that introducing antifouling agent into the by-pass pipe limits and/or avoids complications such as reactor blockage. Without wishing to be bound by any theory, the potentially higher temperature in the by-pass and/or the lower velocity of the reaction mixture in the by-pass may result in reactor blockage due to build-up of fouling. Surprisingly, the inventors have further found that introducing at least part of the anti-fouling agent into the reactor by feeding into one or more of said by-pass pipes leads to more optimal reaction conditions, lower costs and/or improving polymer end-products.

Preferably, the by-pass pipe runs parallel to the reactor path. Preferably, the by-pass pipe connects different parts of the reactor path, preferably the reactor path of the same loop reactor. Preferably, the by-pass pipe connects two points of the reactor path and more preferably, the by-pass pipe is connected to the reactor path in a bend or "elbow" of the reactor path to facilitate easy connection. Preferably, the diameter of the by pass pipe (DB) is smaller than the diameter of the interconnected pipes (DL), more preferably the DB:DL ratio is from 1:12 to 1:2, more preferably from 1:6 to 1:3. Preferably, the interconnected pipes have a diameter of 51 to 61 cm (or 20-24 inch), for instance around 56 cm (or 22 inch). Preferably, the by-pass pipe has a diameter of from 10 to 30 cm (or 4-12 inch), for example around 15 cm (or 6 inch).

Preferably, the by-pass has a different transit time for the slurry than the main reactor path. Preferably, the slurry flows in the main reactor path is from 5 to 15 m/s. Preferably, the slurry in by-pass flows at a speed of higher than 7 m/s, more preferably higher than 10 m/s. Preferably, the by-pass line carriers a fraction of the slurry of from 0.5 to 50%, preferably of 1 to 15% of the total flow rate.

Preferably, antifouling agent is fed to the loop reactor by way of a line connected to the beginning of said by-pass pipe, i.e. upstream in the by-pass. This preferred positioning of the line allows for creating a higher concentration of antifouling agent in the by-pass pipe as compared to reactor path created by the interconnected pipes.

FIG. 1 represents a loop reactor 100 comprising of a plurality of interconnected pipes 104, with a by-pass line 120 inserted between two points of said loop 100. The vertical sections of the pipe segments 104 are preferably provided with heat jackets 105. Polymerization heat can be extracted by means of cooling water circulating in these jackets of the reactor. In an embodiment not shown the by-pass may also be jacketed. According to the present invention, at least part of the antifouling agent is injected into the by-pass 120. In an embodiment, antifouling agent is fed to the loop reactor by way of a line connected to the beginning of said by-pass pipe, i.e. upstream in the by-pass, preferably a diluent flushing line. Reactants are introduced into the reactor 100 by line 107. Catalyst may be injected in the reactor 100 by means of the line 106. The polymerization slurry is directionally circulated throughout the loop reactor 100 as illustrated by the arrows 108 by one or more pumps, such as axial flow pump 101. The pump may be powered by an electric motor 102. As used herein the term "pump" includes any device that raises the pressure of a fluid, by means for example of a piston or set of rotating impellers 103. Reactor 100 is further provided with one or more settling legs 109 connected to the pipes 104 of the reactor 100. The settling legs 109 are preferably provided with an isolation valve 110. These valves 110 are open under normal conditions and can be closed for example to isolate a settling leg from operation. Further, the settling legs can be provided with product take off or discharge valves 111. The discharge valve 111 may be any type of valve, which can permit continuous or periodical discharge of polymer slurry, when it is fully open. Polymer slurry settled in the settling legs 109 may be removed by means of one or more product recovery lines 113, e.g. to a product recovery zone or for instance to a second loop reactor.

The present invention also encompasses the use of anti-fouling agent to prevent or reduce fouling of a loop reactor comprising one or more by-pass pipes, by introducing the antifouling agent into one or more of said by-pass pipes. The present invention also encompasses the use of a composition comprising anti-fouling agent to prevent or reduce fouling of a loop reactor comprising interconnected pipes defining a reactor main path, and further comprising on said interconnected pipes one or more by-pass pipes connecting two points of the same loop by an alternate path having a different transit time than that of the main path, by introducing the antifouling agent into one or more of said by-pass pipes, and wherein said composition comprises less than 10% by weight of monomer, more preferably less than 5% by weight, most preferably less than 1% by weight of monomer. Preferably said composition comprise diluent and a diluent feed line connected to said by-pass is used to introduce said composition into said by-pass.

Preferably, the ratio between the level of antifouling agent in the by-pass pipe and the level of the antifouling agent in reactor path is more than 1 (preferably, the level is expressed as ppm antifouling agent as a function of diluent). Preferably, the anti-fouling agent is fed under flushing with diluent at a rate of more than 100 kg/h. Preferably, the anti-fouling agent comprises cationic agents, anionic agents, nonionic agents, organometallic agents, polymeric agents and mixtures thereof. Preferably, the anti-fouling agent is added to the by-pass pipes in a hexene solution of 0.1 to 10% by weight.

The following non-limiting example illustrates the invention.

EXAMPLE

Ethylene monomer, chromium catalyst, hydrogen, and about 18 t/h of isobutane diluent are fed to a reactor as illustrated in FIG. 1, comprising a by-pass. A 5% by weight solution of antifouling agent in hexene is introduced through a line at the beginning of the by-pass pipe under diluent flushing of 200 kg/h.

The slurry in the main reactor path comprises around 4 ppm antifouling agent (as a function of diluent). The level of antifouling agent at the injection into the by-pass is around 360 ppm (as a function of diluent).

Introduction of the anti-fouling agent in the by-pass leads to a stable reactor and by-pass. There are no blockages, process conditions are well-controlled and an optimal polymer end-product is obtained.

What is claimed:

1. A process comprising:
   introducing a composition into a by-pass pipe of a loop reactor, wherein the by-pass pipe connects two points of the same loop in the loop reactor, and wherein the composition comprises an antifouling agent and a diluent.

2. The process of claim 1, wherein the composition is introduced through a diluent feed line that is connected to the by-pass pipe.

3. The process of claim 1, wherein the composition comprises less than 10% by weight of monomer.

4. The process of claim 1, wherein the composition comprises at least 0.1 of the antifouling agent.

5. The process of claim 1, wherein a ratio between a ppm level of the antifouling agent in the by-pass pipe and a ppm level of the antifouling agent in a reactor path defined by interconnected pipes of the loop reactor is more than 1.

6. The process of claim 1, wherein the antifouling agent is fed under flushing with the diluent.

7. The process of claim 1, wherein the antifouling agent is fed under flushing with the diluent at a rate of more than 100 kg/h.

8. The process of claim 1, wherein the antifouling agent comprises cationic agents, anionic agents, nonionic agents, or mixtures thereof.

9. The process of claim 1, wherein the antifouling agent comprises organometallic agents.

10. The process of claim 1, wherein the antifouling agent comprises polymeric agents.

11. The process of claim 1, wherein the antifouling agent is added to the by-pass pipe in a solvent solution.

12. The process of claim 11, wherein a concentration of the antifouling agent in the solvent solution ranges from 0.1 weight percent to 10 weight percent.

13. The process according to claim 1, wherein at least 10 weight percent of the antifouling agent introduced to the loop reactor is introduced through the by-pass pipe.

14. The process according to claim 1, wherein all of the antifouling agent introduced to the loop reactor is introduced through the by-pass pipe.

15. The process according to claim 1, wherein the by-pass line is parallel to a reactor path defined by interconnected pipes of the loop reactor.

16. A process comprising:
    introducing an antifouling agent into a by-pass pipe of a loop reactor, wherein the loop reactor comprises interconnected pipes defining a reactor path, and wherein the by-pass pipe connects two points of the loop reactor.

17. A process to prevent or reduce fouling of a loop reactor comprising one or more by-pass pipes connecting two points of the same loop of the loop reactor, comprising:
    introducing a composition through a diluent feed line into the one or more by-pass pipes, wherein the diluent feed line is directly connected to the one or more by-pass pipes, wherein the composition comprises an antifouling agent and a diluent, and wherein the composition comprises less than 10 percent by weight of monomer.

* * * * *